United States Patent [19]

Garren et al.

[11] E Re. 31,555

[45] Reissued Apr. 17, 1984

[54] PIPETTE

[75] Inventors: Ralph F. Garren, Canoga Park; B. Sarver, Burbank, both of Calif.

[73] Assignee: Beral Enterprises, Inc., Arleta, Calif.

[21] Appl. No.: 663,069

[22] Filed: Mar. 2, 1976

Related U.S. Patent Documents

Reissue of:

[64] Patent No.: 3,834,241
Issued: Sep. 10, 1974
Appl. No.: 355,714
Filed: Apr. 30, 1973

[51] Int. Cl.[3] ..... B01L 3/02
[52] U.S. Cl. ..... 73/864.11; 222/209
[58] Field of Search ..... 73/425.6; 222/209; 128/233; 141/24

[56] References Cited

U.S. PATENT DOCUMENTS

| | | | |
|---|---|---|---|
| 1,533,753 | 4/1925 | Munch | 128/233 |
| 3,215,171 | 11/1965 | Mitchell | 128/233 |
| 3,538,211 | 11/1970 | Adomaitis | 425/525 |
| 3,938,392 | 2/1976 | Rodrigues | 73/425.6 |

FOREIGN PATENT DOCUMENTS

| | | | |
|---|---|---|---|
| 602363 | 2/1960 | Italy | 128/233 |
| 1169255 | 11/1969 | United Kingdom | 128/233 |

OTHER PUBLICATIONS

Nalgene Labware Catalog 1970, p. 31 (copy submitted by protestor "Labcon").

*Primary Examiner*—S. Clement Swisher
*Attorney, Agent, or Firm*—Lyon & Lyon

[57] ABSTRACT

A pipette which is formed within a mold in which a raw material of a given tubing thickness is employed, the tubing to be of a plastic material, the tubing placed within the mold and caused to be raised in temperature until pliable, the plastic tube caused to be expanded against the surface of the mold, the drawing tube and the container section of the pipette being formed of a thickness to make such substantially rigid, an enlarged bulbous section connected to the container section, the thickness of the bulbous section to be substantially thinner than the container section and the drawing tube section whereby the bulbous portion may be readily manually compressed and then permitted to retract back to its at rest state causing a drawing of liquid through the drawing tube section into the container section.

2 Claims, 3 Drawing Figures

PIPETTE

Matter enclosed in heavy brackets [ ] appears in the original patent but forms no part of this reissue specification; matter printed in italics indicates the additions made by reissue.

BACKGROUND OF THE INVENTION

A pipette is usually defined as a small piece of apparatus into which liquids are taken and which principally consist of a narrow tube into which the liquid is drawn by suction and retained therein by closing the upper end of the tube. Pipettes are usually made of glass and are used almost exclusively to deliver accurately known volumes of liquids or solutions. In the use of pipettes it is common to place an elastomeric bulb over one end of the glass tube pipette to facilitate the drawing of a vacuum so that liquid can be drawn into the pipette.

There are two general categories of pipettes: volumetric or transfer pipettes and the graduated measuring type of pipette. Volumetric pipettes, which includes transfer pipettes, are used by sucking liquid up into the container portion of the pipette, with this liquid being retained therein, and the pipette then moved to a receiving container wherein the liquid is discharged from the pipette. Liquid clinging to the tip of the pipette is removed and the pipette is allowed to empty freely into the receiving vessel. After a few seconds or a time specified on the pipette for drainage, the pipette is then removed. Volumetric pipettes, when handled in the described manner, will deliver reproducibly a definite amount of liquid or solution.

In performing certain laboratory tests, as for example blood tests, transfer pipettes are in extremely common use. From a given sample of a patient's blood, a precise volume of blood will be placed within the transfer pipette with that blood within the pipette being removed to a separate receiving vessel wherein a particular laboratory test is to be performed. Within a given sample of blood, there may be a multitude of different tests performed. A transfer pipette is used to deposit a given volumetric amount of the blood within this particular receiving container. Frequently, a separate transfer pipette is employed to make each deposit so that in performing the tests on a given sample of blood of blood there can be five, ten or more in number of pipettes used. It is readily apparent, considering only blood tests and the number of blood tests performed each year, that a substantial number of pipettes are employed each year with this number being in the multimillions.

Because of the quantity of pipettes employed, such have to be manufactured as inexpensively as possible. Previously, the only known way in which a pipette could be made inexpensively enough was to make the pipettes from glass. Glass is inert and does not contaminate any fluid which the pipette is being used to transfer. However, there is one main disadvantage to glass and that is because glass is so brittle that frequently glass pipettes are broken during transporting from the manufacturer to the consumer.

It has been known that certain types of plastic are inert to most fluids. However, to previously manufacture a plastic pipette in large quantities was not economically feasible because the cost could not be maintained at a low enough level to successfully compete with the cost of glass pipettes.

SUMMARY OF THE INVENTION

The primary objective of the apparatus of this invention is to design a plastic pipette which can be made of an inert material, made sterile, and be manufactured inexpensively enough to be substantially equal in cost to a conventional glass pipette. The primary objective of the method of manufacturing of this invention is to employ a method of making a pipette wherein the resultant overall cost of the pipette is at a level to successfully compete with the cost of conventional glass pipettes.

According to the present invention, the transfer pipette is to be molded as a complete one piece unit including the drawing tube, container portion and bulbous portion so that the overall pipette functions basically as a syringe. Therefore, costs are greatly reduced compared to currently manufactured glass pipettes. In addition, assembly time in the laboratory is eliminated since there is no need to place a syringe upon the pipette.

The pipette of this invention is to be formed from a single plastic tube of a constant diameter. The plastic tube is to be located within a mold cavity and then the mold cavity is to be closed. The tube is to be heated either prior to or after insertion in the mold cavity so that the tube will become soft and pliable. Fluid under pressure is to be forced within the tube to force the tube tightly against the mold cavity surfaces. The drawing tube and the container portion of the pipette are formed substantially rigid. The upper end of the pipette is formed into an enlarged bulbous section, with the thickness of the bulbous section being less than the container portion from the drawing tube portion. The bulbous section can be readily manually squeezed so as to apply either a vacuum or a pressure within the drawing tube section and the container section.

DETAILED DESCRIPTION OF THE SHOWN EMBODIMENT

Figure 1:
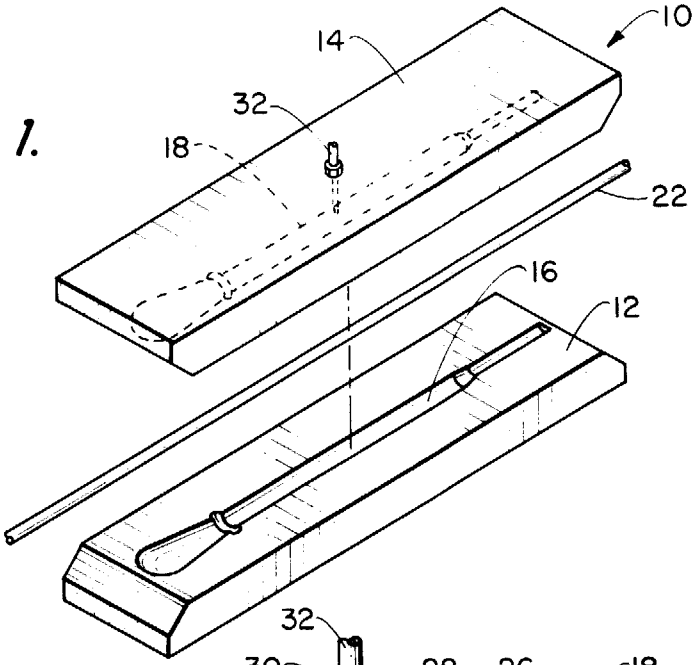
FIG. 1 is an overall isometric view of a mold cavity showing the placement of the tube within the mold cavity prior to the forming of the pipette of this invention.
Figure 3:
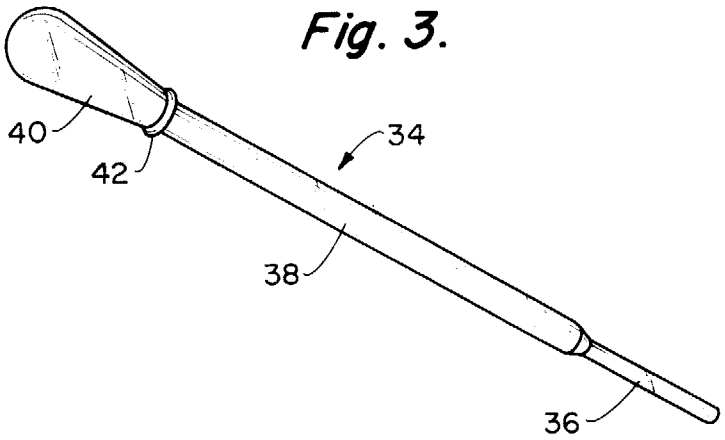
FIG. 3 is an isometric view of the formed pipette of this invention.

Referring particularly to the drawing, there is shown in FIG. 1, a molding apparatus 10 which is basically composed of a lower molding section 12 and an upper molding section 14. Within the lower molding section 12 there is included a lower mold cavity 16. Within the upper molding section 14 is included an upper mold cavity 18. When the molding sections 12 and 14 are located in the together position, the mold cavities 16 and 18 cooperate together to form an overall mold cavity for the pipette of this invention.

The fore edge of each of the molding sections 12 and 14 is formed quite sharp so as to facilitate cutting of the raw material tube 22 when the molding sections 12 and 14 are closed. Fixedly mounted within the upper molding section 14 is a needle 26 which includes an elongated opening 28 formed therein. A connector 30 is connected to the needle 26 with the connector 30 also being attached to air supply tube 32. The length of the needle 28 is selected so that it extends within the upper mold cavity 18. The tube 32 is to be connected to the source of pressurized air (or other fluid) not shown.

The material of construction of the tube 22 can be any suitable thermoplastic material. However, the selection of materials is considered to be a matter of choice. It is envisioned that the material 22 will be a purchased commodity from a manufacturer with a substantial length of the tube 22 being wound upon a reel.

The pipette 34 of this invention includes bassically a drawing tube section 36, a container section 38 and a bulbous portion 40. The drawing tube section 36 is adapted to be inserted within a vessel as to draw liquid up into the drawing tube and into the container section 38. A graduated scale may be located upon the outer surface of the container section 38 so as to indicate to a person the quantity of liquid being drawn into the container portion 38. The bulbous portion 40 is to be of suitable flexibility to prevent failure when squeezed and is to be used to create a vacuum for drawing within and a pressure for expelling the liquid from the container portion 38. A ring 42 is to interconnect the bulbous portion 40 with the container portion 38. The function of the ring is to prevent local collapse of the container portion 38 when the bulbous portion 40 is squeezed.

Figure 2:
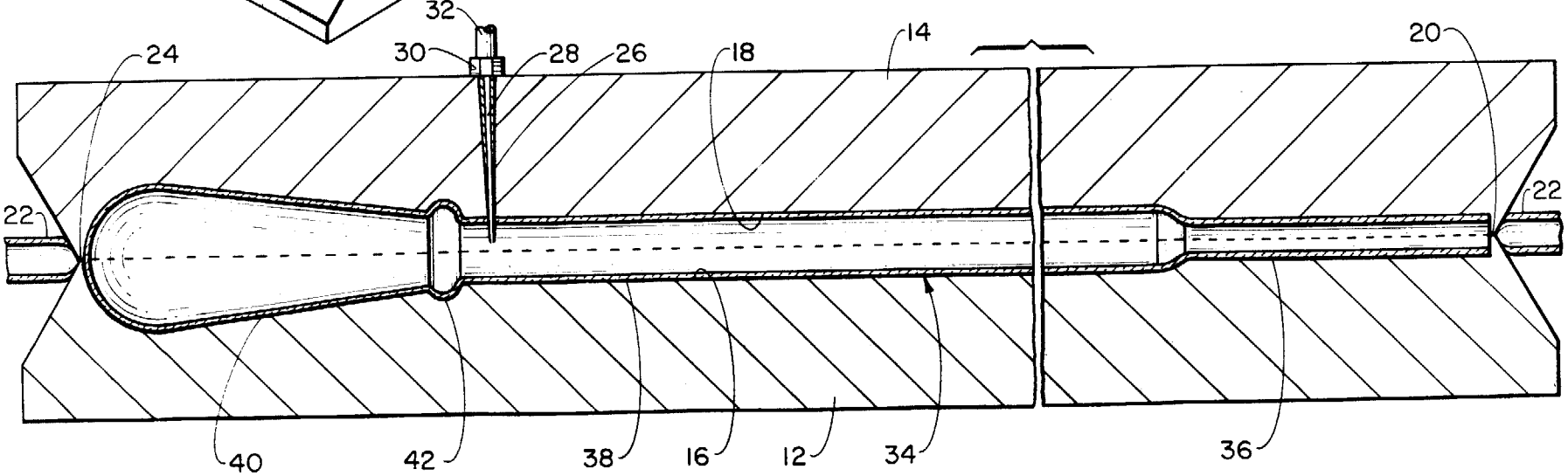
FIG. 2 is a cross-sectional view through the mold cavity basically showing the forming of the pipette of this invention.

As was previously stated, the thickness of the raw material tube 22 was constant. When the molding elements 12 and 14 are in the closed position shown in FIG. 2 of the drawing, the pressurized air is to be conducted through the tube 32 into the opening 28 within the needle 26 and then interiorly of the tube 22 located within the mold cavity. This pressurized air is to force the surfaces of the tube 22 against the mold cavity surfaces. The tube 22 at this point will be pliable. The size of the drawing tube 36 is basically the same size of the outer diameter of the tube 22 so therefore the thickness of the drawing tube will be substantially equal to the original thickness of the tube 22. The size of the container portion 38 is larger than the drawing tube 36 therefore the thickness of the container portion 38 will be less than the thickness of the drawing tube 36 because the material is forced to stretch to accommodate the larger area of the container portion 38. The stretching of the material within the container portion 38 is not to be accomplished to such an extent so that the container portion 38 loses its rigidity.

The same stretching is accomplished within the bulbous portion 40 with the area of the bulbous portion cavity being substantially greater than the area of the container portion 38. As a result, the thickness of the material within the bulbous portion 40 is substantially less than that of the container portion 38. As a result, the bulbous portion 40 loses its rigidity and can be readily manually squeezed. However, once the manually squeezing force is no longer applied to the bulbous portion 40, the bulbous portion 40 will return to its initially established shape. However, this squeezing action will cause a vacuum to be drawn within the container portion 38 and the drawing tube 36 in order to suck fluid into the container portion 38. The bulbous portion 40 will also be used to expel fluid from the container portion 38.

A annular ring 40 interconnects the bulbous portion 40 to the container portion 38. This ring is to prevent collapse of the aft end of the container portion 38 during the squeezing action of the bulbous portion 40.

The manufacturing process for the making of the pipette 34 of this invention is designed so that the pipette can be made in one stage. The various components of the manufacturing equipment are designed to work automatically. The various manufacturing steps will be accomplished sequentially on a predetermined time cycle. The raw material tubing 22 will be fed into the molding apparatus 10 from reels. The finished pipettes 34 will be placed onto a conveyor belt and to a gravimetric station where such will be packaged and distributed.

The process of this invention is as follows:

1. The extruded plastic tube 22 is drawn through the open molding sections 12 and 14 of the molding apparatus 10 as shown in FIG. 1 of the drawing.

2. The tubing 22 will then be heated to its softening point by a heat source such as by quartz heaters, infared heaters or some other type of energy source.

3. The molding sections 12 and 14 will then be closed when the plastic tube 22 has reached the softening point. The heaters will then be removed. By closing of the molding sections 14 and 16 the tube 22 is pinched shut at each end of the cavity which describes the longitudinal ends of the pipette 34. It is considered to be within the scope of this invention to heat the tube after the molding sections 12 and 14 are closed rather than prior to closing of these sections.

4. When the molding sections 12 and 14 are closed, the heat softened plastic tube 22 is expanded against the walls of the molding cavities 16 and 18 by means of air pressure supplied through the passage 28 of the needle 26. Also, it is considered to be within the scope of this invention that instead of using a needle 26, that a vacuum could be applied to the surfaces of the molding cavity 16 and 18. This vacuum would cause the tube 22 to expand against the cavity surfaces. It is also considered to be within the scope of this invention to use both of the needle and vacuum simultaneously.

5. Once the pipette 34 has been formed within the molding sections 12 and 14, the tube is to be cooled. This cooling can be accomplished by circulating a cooling liquid through cooling circulating passages located within the molding sections 12 and 14. This cooling is to be accomplished until the plastic is cooled below the softening point. If a vacuum is used to form the pipette, then the air inside the softened tube will expand rapidly and subsequently cool the plastic below the softening point during the following process. It is considered within the scope of this invention that both of these methods could be accomplished simultaneously or other cooling methods could be employed.

6. The molding sections 12 and 14 will now be opened to the spaced apart position shown in FIG. 1 and the finished pipette 34 ejected.

After the pipette 34 is formed and removed from the mold cavity, a small aperture may be formed through the sidewall of the container portion 38 which would be produced due to the needle 26. It is envisioned that this aperture will be closed by the placing of a plastic or paper patch over this hole prior to distributing of the pipette 34 to the consumer. It is also to be considered within the scope of this invention that the pipette 34 can be removed from the mold cavity prior to complete hardening and the aperture formed within the container portion 38 can then be closed during final hardening.

No cutting or trimming will be necessary of the pipette 34. The process described above relates to a method for making a single pipette 34 at a time It is envisioned that the pipettes will be formed in multiples through the use of multicavity molds. It is envisioned that the thickness of the raw material tube 22 will be 30 thousandths of an inch. After the forming of the pipette 34, the drawing tube 36 will be 30 thousandths of an inch in thickness, the container portion 38 will be 15 thousandths of an inch in thickness and the bulbous portion 40 will be 7 thousandths of an inch in thickness. It is to be considered that these dimensions are merely illustrative and this invention is in no way to strictly adhere to these dimensions.

What is claimed:

1. A single piece pipette formed in an integral manner of plastic material, said pipette comprising:

a drawing tube section adapted to draw fluid from a vessel;

a container portion connected to said drawing tube, said drawing tube having an opening therethrough communicating with an enlarged interior chamber located within said container portion, both said container portion and said drawing tube being [formed] substantially rigid;

a bulbous *imperforate* portion connected to the free end of said container portion, said bulbous portion being readily felxible so that it is capable of being squeezed to apply an air pressure force or a vacuum within said chamber of said container portion;

[the wall thickness of said container portion being approximately one-half the wall thickness of said drawing tube, the wall thickness of said bulbous portion being approximately one-half the wall thickness of said container portion;] *the wall thickness of said container being less than the wall thickness of said drawing tube and greater than the wall thickness of said bulbous portion* and means interconnecting said bulbous portion and said container portion for preventing local collapse of said container portion during squeezing of said bulbous portion.

2. The pipette as defined in claim 1 wherein:

said means comprises a rigid wall disposed at an angle to both the wall of said container portion and the wall of said bulbous portion.

* * * * *